United States Patent
Main

[11] Patent Number: 6,035,707
[45] Date of Patent: Mar. 14, 2000

[54] CAMSHAFT BENCH TESTER

[76] Inventor: Scott Main, 17683 E. Jamison, Aurora, Colo. 80016

[21] Appl. No.: 08/993,771

[22] Filed: Dec. 18, 1997

Related U.S. Application Data

[60] Provisional application No. 60/034,271, Dec. 19, 1996.
[51] Int. Cl.[7] .................................................. G01M 15/00
[52] U.S. Cl. ........................................... 73/116; 73/119 R
[58] Field of Search .................... 73/116, 117.1, 73/117.2, 117.3, 119 R

[56] References Cited

U.S. PATENT DOCUMENTS

| | | |
|---|---|---|
| 3,796,092 | 3/1974 | Klinger et al. . |
| 4,517,843 | 5/1985 | Leger . |
| 4,656,897 | 4/1987 | von Niederhäusern et al. . |
| 4,691,288 | 9/1987 | Kay et al. . |
| 4,724,805 | 2/1988 | Wirth et al. ............................ 123/90.39 |
| 4,732,036 | 3/1988 | Weeder . |
| 4,817,420 | 4/1989 | Kawaguchi et al. . |
| 4,862,845 | 9/1989 | Butterfield et al. ................... 123/90.15 |
| 4,891,972 | 1/1990 | Kawaguchi et al. . |
| 5,355,713 | 10/1994 | Scourtes et al. ........................ 73/117.2 |
| 5,417,109 | 5/1995 | Scourtes . |
| 5,671,706 | 9/1997 | Frost et al. ............................ 123/90.17 |
| 5,780,730 | 7/1998 | Scourtes et al. ........................ 73/117.2 |
| 5,787,848 | 8/1998 | Stefanopoulos et al. ............. 123/90.15 |

*Primary Examiner*—Eric S. McCall
*Attorney, Agent, or Firm*—Swanson & Bratschun LLC

[57] ABSTRACT

An apparatus and method for simulating the operating environment of a camshaft. A housing defines a chamber, the chamber being sized to receive the camshaft and to permit axial rotation of the camshaft within the chamber. The housing is supported by a frame. At least one valve assembly is attached to the frame in operative engagement with a lobe of the camshaft. The valve assembly is movable lengthwise of the housing into operative engagement with a lobe at a different position lengthwise of the camshaft. The valve assembly is also adjustable radially. An oil circulation system provides oil to the chamber to cool and lubricate the camshaft. A first end of the camshaft is secured by an arbor which is movable axially to accommodate different length shafts. A second end of the camshaft is engaged by a spindle connected to a motor to rotate the shaft at high RPM to simulate an operating environment.

16 Claims, 3 Drawing Sheets

CAMSHAFT BENCH TESTER

This application claims priority under 35 USC § 119(e) from U.S. Provisional patent application Ser. No. 60/034,271, filed Dec. 19, 1996.

BACKGROUND OF THE INVENTION

1. Technical Field

The present invention is directed toward a bench tester for a camshaft, and more particularly toward an apparatus for simulating the operating environment of a camshaft.

2. Background Art

Camshafts consist of a shaft having a plurality of axially spaced lobes or cams. In use in an internal combustion engine, the camshaft actuates valves of the engine during the combustion cycle. A persistent problem with camshafts, particularly camshafts used in high stress environments, such as NASCAR engines, is premature failure of the camshafts. The problem is exacerbated by camshafts having aggressive lobe designs intended to improve engine efficiency. The aggressive lobe design has increased the failure of camshafts. In addition, higher valve spring pressures are required to maintain valve lifter contact in camshafts having the aggressive lobe design. These increased valve pressures further contribute to camshaft failure. Not only can premature failure end a driver's attempt at winning or competing in a race, failure of the camshaft can render serious injury to expensive, high performance engines. While there are a number of ways to physically inspect a camshaft, these inspection techniques fail to identify all camshafts which will actually fail under operating conditions.

Prior to the advent of camshafts having aggressive lobe design and engines having increased valve spring pressure, testing the camshaft using low pressure valve springs at 2000 RPM for 30 minutes was considered a sufficient "break in" period to insure the camshaft would not fail prematurely. However, with current camshafts featuring an aggressive lobe design this traditional testing and "break in" technique has been found inadequate in anticipating extreme cam or lobe wear.

Experience has shown that if a camshaft is going to fail, it typically does so within the first couple of hours of use. To date, this use could only come from actually deploying the camshaft in a high revolution engine such as a NASCAR engine. However, because as discussed above, failure of the camshaft can cause serious injury to an engine, this method of testing camshafts is both cumbersome and potentially very expensive.

The present invention is directed toward overcoming one or more of the problems discussed above.

SUMMARY OF THE INVENTION

An apparatus for simulating the operating environment of a camshaft includes a housing defining a chamber, the chamber being sized to receive the camshaft and to permit axial rotation of the camshaft within the chamber. The housing is supported by a frame. At least one valve assembly is attached to the frame in operative engagement with a lobe of the camshaft The valve assembly is movable lengthwise of the housing into operative engagement with a different lobe. The valve assembly is also adjustable radially. An oil circulation system provides oil to the chamber to cool and lubricate the camshaft. A first end of the camshaft is secured by an arbor which is movable axially to accommodate different length shafts. A second end of the camshaft is engaged by a spindle connected to a motor to rotate the shaft at high RPM to simulate an operating environment.

The apparatus for simulating the operating environment of a camshaft of the present invention enables a camshaft to be subjected to operating conditions prior to installation into a automobile engine. Thus, by subjecting a camshaft to testing by the apparatus, a user of the camshaft can have increased confidence that the camshaft will not fail under actual use. The apparatus has an adjustable arbor to accommodate camshafts of different lengths. In addition, the valve assemblies are adjustable both radially and axially to accommodate different placements of lobes on different makes of camshafts. Finally, the apparatus is made from readily obtainable materials and consists of simple mechanical components to insure a high degree of reliability and ease of use.

DETAILED DESCRIPTION OF THE PREFERRED EMBODIMENT

Figure 1:
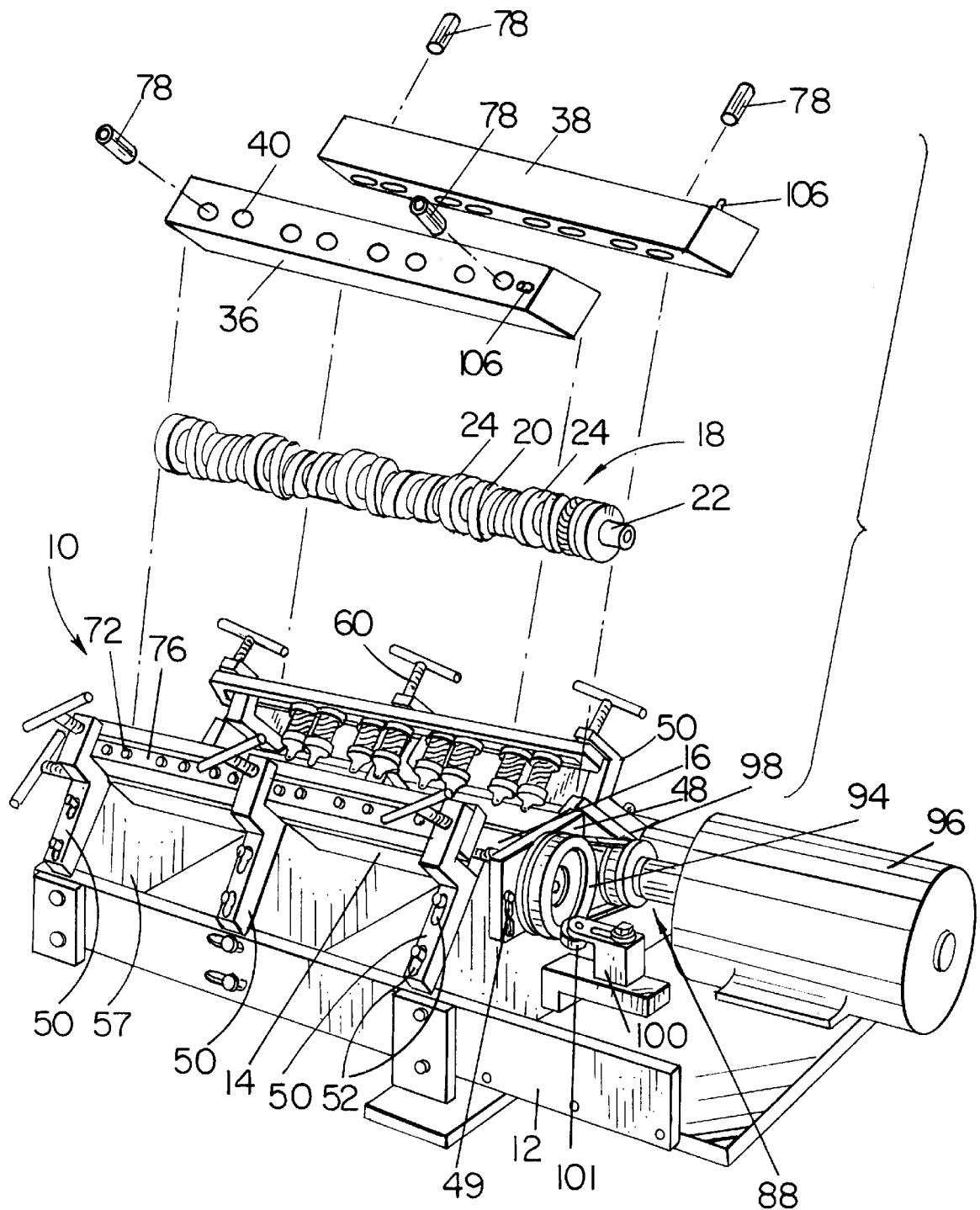
FIG. 1 is a perspective view of the apparatus for simulating an operating environment of a camshaft with a camshaft and a housing top exploded.

An apparatus 10 for simulating the operating environment of a camshaft is shown in a perspective view in FIG. 1. The apparatus consists of a frame 12 which supports a housing 14 which defines a chamber 16 for receiving a camshaft 18. The camshaft 18 consists of a plurality of axially spaced lobes or cams 20 attached to a shaft 22. A number of alignment bearings 24 are axially spaced among the lobes 20 and coaxially attached to the shaft 22.

Figure 2:
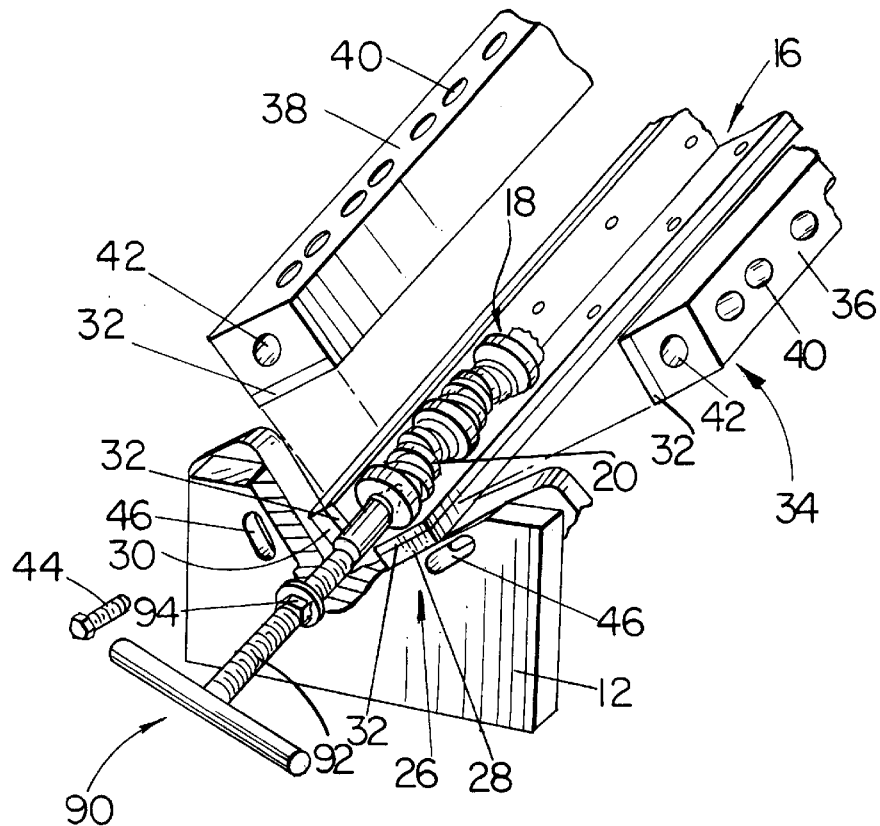
FIG. 2 is a partial perspective view illustrating a camshaft received in the chamber defined by the housing.

The housing 14 is most clearly illustrated in FIG. 2. The housing 14 consists of a housing bottom 26 made of first and second bottom blocks 28, 30. Each of the first and second bottom blocks 28, 30 has a leading surface with a low friction bearing layer surface 32 attached. As seen in FIG. 2, the bearing surfaces 32 actually form the bottom of the chamber 16. The bearing surface 32 is made of a durable thermoplastic or nylon to endure friction generated by the alignment bearings 24 contacting the bearing surfaces 32 during operation. The housing top 34 consists of first top block 36 and a second top block 38. Each of the top blocks 36, 38 also include a leading surface having a bearing surface 32. The top blocks 36, 38 each contain a plurality of lengthwise spaced bores 40. The bores 40 are spaced along the length of the first and second top blocks 36, 38 to correspond to the lobes 20 of the camshaft 18. At each end of the first and second top blocks 36, 38 is a threaded hole 42. When the first and second top blocks are moved into position so as to define the chamber 16, bolts 44 fit into the slots 46 in the frame 12 to secure the first and second top blocks 36, 38 in place. As can be observed in FIG. 2, the blocks can be slid along the slots 46 to provide for adjusting the size of the chamber to accommodate camshafts of varying radial size.

Referring back to FIG. 1, the housing bottom 26 is attached at each end to an end plate 46 (only one shown in FIG. 1). The end plate 46 is secured to the frame 12 by bolts received in the slots 48. The slots 48 allows the plate 46 to be moved up and down on the frame, again to help accommodate camshafts of varying radial size.

With the lower blocks 28, 30 and the top blocks 36, 38 in an operative position relative to a camshaft 18, the chamber 16 has substantially a square cross section with the length of each bearing surface 32 corresponding roughly to the diameter of the alignment bearings 24.

The frame 12 includes a plurality of lengthwise spaced stepped brackets 50. Each of the stepped brackets 50 includes a pair of lengthwise spaced slots 52. Bolts 54 are received in the slots 52. As is perhaps best illustrated in FIG. 3, the bolts 54 can be loosened and the stepped brackets 52 can be slid in the directions of the arrow 56 to allow lengthwise adjustment of the position of the stepped brackets relative to the frame base 57. At a distal end of the stepped brackets is a threaded hole 58 for receiving the threaded adjustment shaft 60. A distal end of the threaded adjustment shaft 60 is attached to a valve mechanism block 62. As illustrated by the arrow 64, by turning the handles 66 at the proximal ends of the threaded adjustment shaft 60, the valve adjustment block 62 can be moved in and out relative to the stepped brackets 50.

Figure 3:
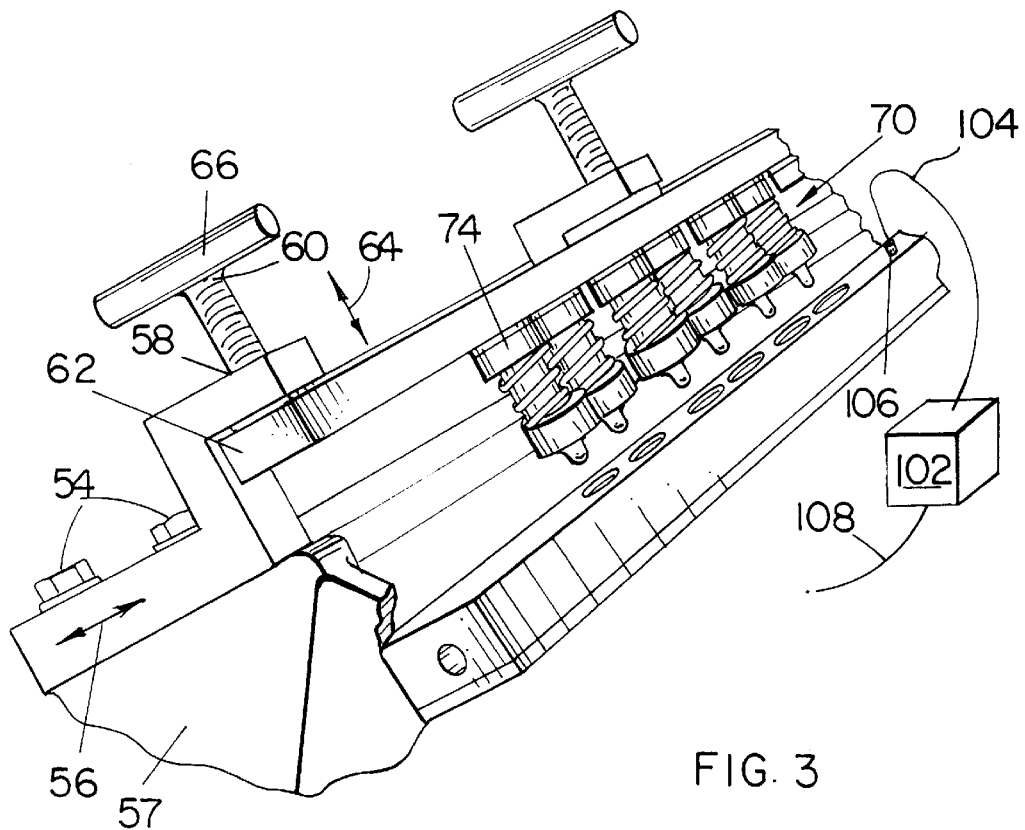
FIG. 3 is a partial perspective view illustrating the adjustability of the valve assemblies.
Figure 4:
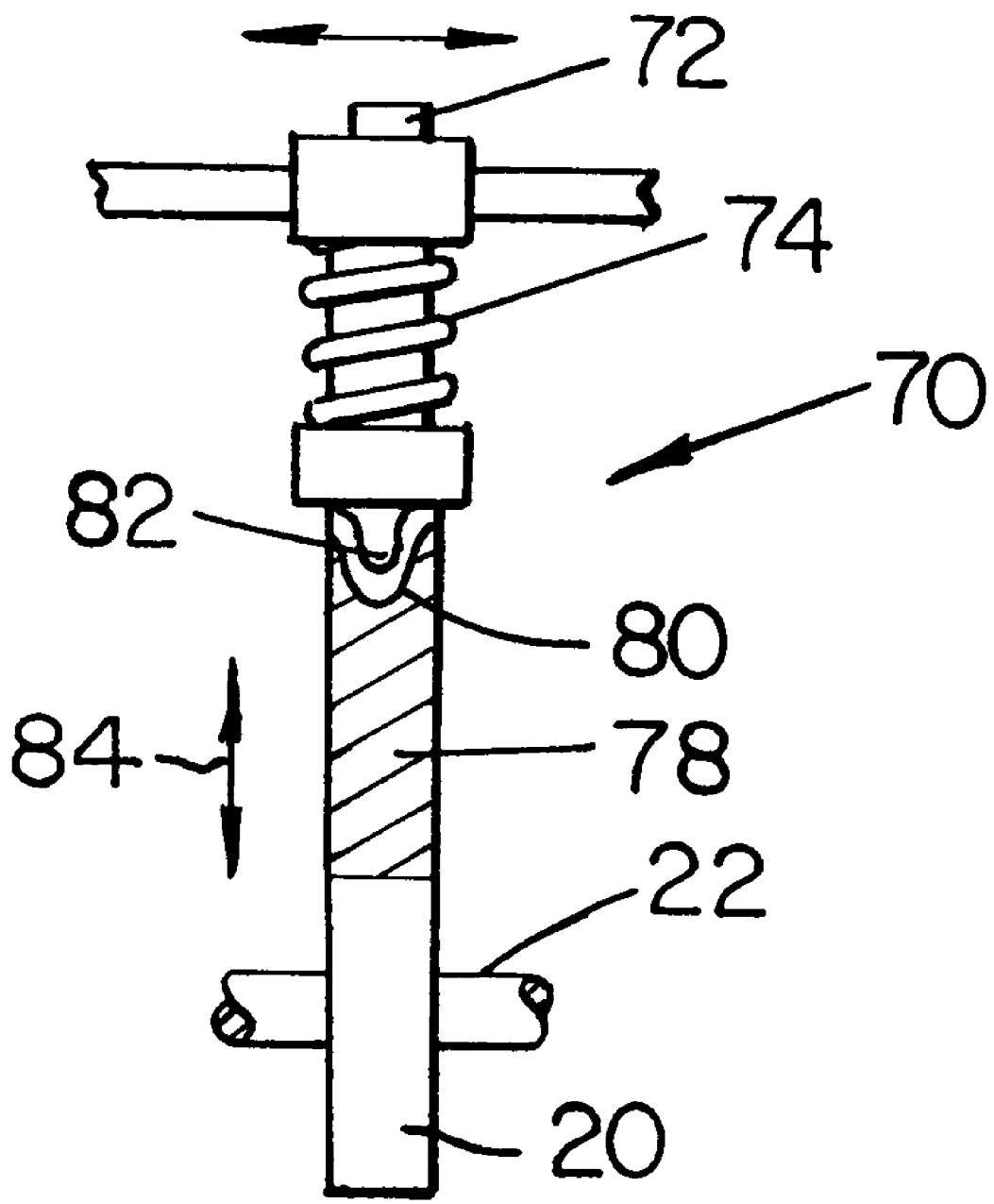
FIG. 4 is a sectional elevation view of a valve assembly operatively associated with a camshaft lobe.

As seen in FIGS. 1 and 3, a plurality of lengthwise spaced valve assemblies 70 are attached to the valve adjustment block 62. A bolt 72 axially engages each spring member 74 of the valve assembly 70. The bolt 72 can be loosened and the spring members 74 slid lengthwise of adjustment block 62 within the elongate slot 76 in the valve adjustment block 62. The valve assemblies 70 also consist of valve lifters 78 which are received in the lengthwise spaced bores 40 as illustrated in FIG. 1. Each valve lifter 78 includes a socket 80 for receiving a nipple 82 on a distal end of the spring member 74. As illustrated in FIG. 4, in operation the valve lifter 78 engages a circumferencial edge of the lobe 20 and is lifted up and down against the action of the spring member 74 as the lobe 20 is rotated by the camshaft 22 as indicated by the arrow 84. This action simulates the valve action a camshaft experiences in a car engine.

The apparatus 10 also includes a drive system 88 for rotating the camshaft 18 at a high rate or high RPMs. The drive system 88 consists of an arbor 90 having a threaded shaft 92 which is threadably received in a hole in the frame 12 and which permits the arbor 90 to be axially extended and withdrawn from the frame 12 so as to accommodate drive shafts of varying lengths. As illustrated in FIG. 2, in use the arbor 90 is threaded so that its distal end pushes against an axis of the camshaft 12 at one end of the camshaft and the arbor 90 then is secured in position relative to the frame by the bolt 94. The other end of the shaft 18 cooperatively engages a yoke (not shown) which extends through the end plate 46 of the frame 12 and which is attached to the pulley 94. A double wiper seal (not shown) between the plate 48 and the yoke prevents oil from leaking out of the chamber. As best seen in FIG. 1, the pulley 94 is connected to the drive shaft of an electric motor 96 by a belt 98. The drive shaft is oriented so that as it is rotated by the drive system 88, it is biased toward the arbor 90. However, an adjustable stop 100 is attached to the frame. The frame 100 maintains a wheel 102 in a fixed position relative to the pulley 94 to eliminate any possibility of the pulley 94 being driven axially from the drive shaft 18. In use, the housing top 34 must be customized for each camshaft to be bench tested by the apparatus 10. Thus, the lengthwise spaced bores 40 must be located to correspond to the circumferencial surfaces of the lobes 20. In addition, the housing bottom 26 must be adjusted up and down via the slots 48 of the end plate 46 depending upon the effective diameters of the lobes 20 and alignment bearings 24. Moreover, the valve assemblies 70 must be configured to correspond to the lengthwise spaced bores 40 of the housing top 34. This can be done by sliding the spring members 74 lengthwise within the elongate slot 76 and securing them where desired by the bolts 72. The valve lifters 78 are then inserted into the various bores 40 and the first top block 36 and the second top block 38 are secured in position relative to the first and second bottom blocks 28, 30 by tightening the bolts 44 in the select position of the slots 46. Next, the spring members 74 are brought into the proper position by loosening the bolts 54 and sliding the stepped brackets 50 in the directions indicated by the arrow 56 and then resecuring the stepped brackets in a select position using the bolts 54. Finally, the spring members 74 are placed in a select position radially relative to the camshaft 18 by advancing or retracting the valve adjustment block 62 in the directions indicated by the arrow 64 of FIG. 3 using the threaded adjustment shafts 60.

An oil pump 102 is illustrated schematically in FIG. 3. The oil pump has a pair of feed lines 104 (only one shown in FIG. 3) that attach to an oil distribution nipple 106 on the first and second top blocks 36, 38. Although not shown, the first and second top blocks 36, 38 include an internal network for distributing oil from the pump 102 into the chamber 16. Oil is then circulated from the chamber 16 back to the pump 102 through the return line 108 which is, although not illustrated, connected to drain ports on the first and second bottom blocks 28, 30.

In operation, the camshaft 18 can be rotated at a select RPM for a select period of time. The valve assemblies 70 simulate the action of actual valves on the camshafts 18, and any defect in the camshaft should be manifest after an extended bench test. Circulating the oil by use of the pump 102 not only lubricates the camshaft 18 within the chamber 16, it also helps cool the assembly. Thus, defects that before could only be detected through actual use of a camshaft under high stress conditions such as NASCAR racing which require an actual engine and could subject the engine to sever damage in the event of camshaft failure, can be conducted using this apparatus without risk to harming an engine. Not only is potential harm to an engine prevented, users of pretested camshafts can have a high degree of confidence that their camshafts will not fail when actually deployed in an engine. Finally, because the apparatus is fully adjustable to accommodate camshafts of varying length, axial cam location and circumferencial dimensions a wide variety of camshafts can be tested at minimal costs.

What is claimed is:

1. An apparatus for simulating an operating environment of a camshaft, the camshaft having at least one lobe mounted to an elongate shaft at a first select lengthwise position, the apparatus comprising:

a housing defining a chamber, the chamber being sized to receive the camshaft and to permit axial rotation of the camshaft within the chamber;

a frame supporting the housing; and at least one valve assembly attached to the frame in operative engagement with the at least one lobe of the camshaft, the valve assembly being movable lengthwise of the housing into operative engagement with a lobe mounted to the elongate shaft at a lengthwise position different than the first select lengthwise position.

2. The apparatus of claim 1 wherein the entire valve assembly is movable radially of the camshaft into operative engagement with a lobe having profile dimensions different than the at least one lobe.

3. The apparatus of claim 1 further comprising means for circulating oil through the chamber.

4. The apparatus of claim 1 further comprising a drive operatively engaging the camshaft for rotating the camshaft at a select RPM.

5. The apparatus of claim 1 wherein the housing has a bore into the chamber corresponding axially to each lobe of the camshaft and the valve assembly comprises a valve lifter received in each bore with a first end in contact with a peripheral edge of the corresponding lobe and a second end operatively associated with a spring biasing the first end of the lifter into abutment with the peripheral edge of the lobe.

6. The apparatus of claim 1 wherein the housing comprises:

first and second bottom blocks each having a leading surface, the first and second bottom blocks being attached to the frame to maintain the leading surfaces in lengthwise abutment with an angle of about 90° between the leading surfaces; and first and second top blocks each having a leading surface, the first and second top blocks being removably attached to the frame with the leading surfaces of the top blocks in lengthwise abutment with an angle of about 90° between top block leading surfaces and the leading surfaces of the top blocks and bottom blocks in lengthwise abutment with an angle of about 90° between adjacent surfaces, whereby the leading surfaces define the chamber having a square cross-section.

7. The apparatus of claim 6 further comprising a low friction bearing layer on each leading surface of top and bottom blocks.

8. The apparatus of claim 6 wherein the top blocks are movable radially relative to the bottom blocks to accommodate camshafts having lobes of varying profile dimensions.

9. An apparatus for simulating an operating environment of a camshaft within an internal combustion engine, the camshaft having a plurality of axially spaced lobes mounted to an elongate shaft, the apparatus comprising:

a housing defining a chamber, the chamber being sized to operatively receive the camshaft and the housing including a plurality of holes communicating with the chamber axially spaced to correspond with the lobes of a camshaft operatively received in the chamber, wherein the housing is not an internal combustion engine cylinder head;

a plurality of valve assemblies operatively associated with the housing, with one valve assembly received in each hole in operative engagement with a corresponding lobe; and a drive operatively associated with the camshaft received in the housing for rotating the camshaft axially at a select rate.

10. The apparatus of claim 9 wherein the housing further comprises a top and bottom, the top being movable radially relative to the bottom to define a chamber of varying cross-sectional dimension to receive camshafts having lobes of different profile dimensions.

11. The apparatus of claim 9 wherein the valve assemblies are attached to a frame supporting the housing, the valve assemblies being slidable lengthwise of the housing to variable select lengthwise positions.

12. The apparatus of claim 9 further comprising means for varying radial spacing of the valve assemblies relative to the camshaft.

13. The apparatus of claim 9 wherein each valve assembly comprises a valve lifter received in each bore with a first end in contact with a peripheral edge of the corresponding lobe and a second end operatively associated with a spring biasing the first end of the lifter into abutment with the peripheral edge of the lobe.

14. The apparatus of claim 9 wherein an inner wall of the housing defining the chamber has a low friction bearing layer.

15. A method for bench testing a camshaft having a plurality of spaced lobes attached to a shaft, the method comprising:

providing a housing defining a chamber sized to receive the camshaft, the housing having a plurality of holes in communication with the chamber spaced lengthwise of the housing to correspond with the lobes of the camshaft, wherein the housing is not an internal combustion engine cylinder head;

providing a valve assembly in each hole;

adjusting a radial position of each valve assembly into operative engagement with the corresponding camshaft lobe;

flowing a lubricant through the chamber; and axially rotating the camshaft at a select rate for a select period.

16. The method of claim 15 further comprising:

providing a frame supporting the housing, each valve assembly being attached to the frame; and sliding each valve assembly lengthwise of the housing to bring the valve assembly into operative engagement with the corresponding camshaft lobe.

* * * * *